Patented Feb. 22, 1927.

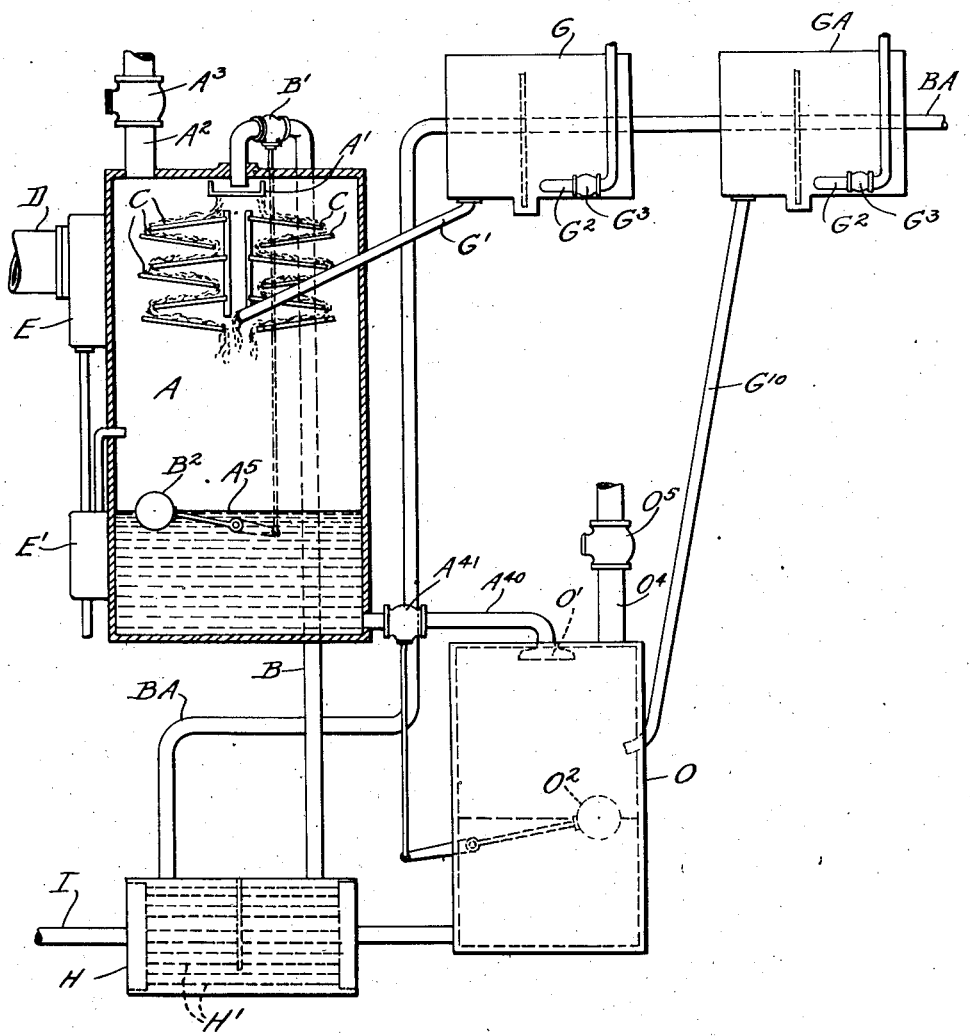

1,618,424

UNITED STATES PATENT OFFICE.

GEORGE H. GIBSON, OF UPPER MONTCLAIR, NEW JERSEY, ASSIGNOR TO COCHRANE CORPORATION, OF PHILADELPHIA, PENNSYLVANIA, A CORPORATION OF PENNSYLVANIA.

DEAERATING WATER.

Original application filed September 18, 1920, Serial No. 411,232. Divided and this application filed April 2, 1926. Serial No. 99,215.

The general object of the present invention is to provide a simple and effective method of and apparatus for heating water and freeing it from air dissolved in it. The invention was primarily devised for use in preheating boiler feed water where the water is heated in part by being passed through an economizer or water heater receiving heat from the flue gases issuing from the boiler furnace, but the invention is not restricted to such use. The primary purpose of removing the air dissolved in the water is to reduce the corrosive effect of the water, which is especially deleterious in the case of an economizer when, as is frequently desirable, the tubes of the economizer are made of steel.

In a preferred mode of carrying out the invention, the air is removed from the water by first passing the water through an ordinary feed water heater operated to heat the water to a suitable temperature, after which the water is passed into a spray chamber in which a pressure is maintained which is lower than the pressure in the steam space of the first mentioned heater so that a portion of the water entering the spray chamber flashes into steam and the unvaporized water is cooled. In proceeding in this manner, some of the air is liberated in the heater and the remainder is liberated in the spray chamber, and I make provisions for withdrawing air from the heater and from the spray chamber. Advantageously, means are provided for recovering heat from the steam or water vapor passing out of the heater and spray chamber with the air escaping therefrom.

In using the invention in connection with an economizer, I advantageously employ a heat exchanger in the path of the water from the spray chamber to transfer heat to the water passing to the open water heater from the water which passes from the spray chamber to the economizer, thereby increasing the economizer efficiency while at the same time avoiding any waste of heat. The heat thus imparted to the water entering the feed water heater reduces the amount of steam which must be utilized in the heater. The vapor pressures in the heater and spray chamber may vary with conditions. If the vapor pressure in the spray chamber is approximately equal to or a little above that of the atmosphere, the liberated air may be discharged into the atmosphere from the spray chamber, as well as from the open water heater, without the use of any special ejecting apparatus.

The various features of novelty which characterize my invention are pointed out with particularity in the claims annexed to and forming a part of this specification. For a better understanding of my invention, however, and the advantages possessed by it, reference should be had to the accompanying drawing and descriptive matter in which I have illustrated and described a preferred embodiment of my invention.

The one figure of the drawings is a somewhat diagrammatic representation of apparatus embodying the present invention.

In the drawing, A represents an open feed water heater provided at its upper end with a trough $A^1$ receiving the water to be heated which is supplied by a pipe B. The water overflowing from the trough $A^1$ falls onto splash trays or baffles C. The supply of water to the heater is regulated by valve $B^1$ in the supply pipe B which is controlled by a float $B^2$ so as to maintain the water level in the heating chamber approximately at the level of the line $A^5$. $A^2$ represents a vent pipe from the heater, and $A^3$ a back pressure valve therein, set to open and permit the escape of excess steam when the pressure in the heater exceeds the predetermined maximum pressure desired. D represents an exhaust steam supply pipe through which exhaust steam passes into the heating chamber through the usual oil and water separator E, the drip from which passes into a discharge trap $E^1$, which may also serve to take the overflow of water from the heater when the water level rises too high in the heater. In so far as above described, the open feed water heater shown is of well known type.

The air liberated from the water in the heater passes out of the latter through the inclined pipe $G^1$ into a cooler G, which, as shown, is in the form of a drum surrounding the cold water supply pipe BA. The drum G is provided with an air outlet $G^2$, flow through which may be controlled by an automatic air valve $G^3$, which may well be of the sylphon or other known thermostatic type and which permits the escape of the air but prevents the escape of steam.

The water passes from the heater A into the upper end of a spray chamber O through a pipe $A^{40}$ connected within the spray chamber O to a spray head or rose $O^1$. The height of water level in the spray chamber O is regulated by a float $O^2$ controlling a valve $A^{41}$ in the water conduit $A^{40}$. The spray chamber O is provided with a pressure limiting vent connection $O^4$ provided with a back pressure valve $O^5$ set to open when the pressure in the spray chamber O reaches a desired maximum therein which is ordinarily about that of the atmosphere.

The spray chamber O is provided with a cooler GA similar to the cooler G, and cooled by the water passing through the pipe BA to the heater A. The cooler GA is connected to the tank O by a pipe $G^{10}$ which serves like the connection G' to the cooler G, as a conduit for passing air and water vapor into the cooler GA from the spray chamber O, and for returning water of condensation to the latter.

The water passing away from the spray chamber O passes through the tubes H' of a heat exchanger H, and the water passing to the heater A passes through the intertube space of the heat exchanger H through which the pipes B and BA are connected.

In the operation of the apparatus shown in the drawings, the back pressure valve $A^3$ should be set, and the steam supply to the heater so regulated that the desired pressure is maintained in the steam space of the heater A. If this is a few pounds above that of the atmosphere, for example, the water passing into the spray chamber A will be at a temperature corresponding to the steam pressure in the heater A, of say 220° F. if the back pressure in the heater A is about three pounds. Since the apparatus is operated to maintain a steam pressure in the spray chamber O which is lower than that of the heater, for example, approximately that of the atmosphere, as the water is sprayed into the steam space of the chamber O, there is an appreciable generation of steam and a liberation of practically all air and gas not liberated from the water in the heater A. The air thus liberated in the chamber O passes into the cooler GA and is discharged from the latter through the air valve $G^3$ in the outlet $G^2$. The heat of evaporation contained in the steam passing into the cooler GA through the connection $G^{10}$ is used in heating up the water passing through the pipe B.

The exact temperatures maintained in the apparatus may be varied to meet conditions, but in any event the water passing from the chamber O through the heat exchanger H and thence through the pipe I to an economizer or other place of use, will be appreciably lowered in temperature in the exchanger H, which will increase the effectiveness of the economizer if the latter be employed.

It will be obvious to those skilled in the art that the method of operation, and the apparatus required for carrying out the operation described are simple and effective and do not require special skill or care on the part of the attendant. The invention is well adapted for use in handling relatively large quantities of water, and is economical in the consumption of heat, practically no heat being lost in the operation except such as results from radiation losses, which, with properly constructed and arranged apparatus, will be small.

The deaeration of water is effected by the consumption of a relatively and desirably small amount of steam, which, especially in many modern plants in which the supply of available exhaust steam is restricted, is desirable to avoid lowering the plant efficiency.

Certain features of invention disclosed but not claimed herein are claimed in my application Serial No. 411,232, filed September 18, 1920, of which this application is a division.

While in accordance with the provisions of the statutes, I have illustrated and described the best form of my invention now known to me, it will be apparent to those skilled in the art that changes may be made in the form of the method and apparatus described without departing from the spirit of my invention as set forth in the annexed claims.

Having now described my invention, what I claim as new and desire to secure by Letters Patent, is:

1. Water heating and treating apparatus comprising in combination, an open water heater provided with an oulet for the escape of air, a spray chamber provided with an outlet for the escape of air, connections for passing water successively through the heater and spray chamber, and provisions for maintaining a steam pressure in the heater appreciably above that in the spray chamber.

2. Water heating and treating apparatus comprising in combination, an open water heater provided with an outlet for the escape of air, a spray chamber provided with an outlet for the escape of air, connections for passing water successively through the heater and spray chamber, and provisions for maintaining a steam pressure in the heater appreciably above that in the spray chamber, and a heat exchanger adapted to transfer heat from the water leaving the spray chamber to the water entering the heater.

3. Water heating and treating apparatus comprising in combination, an open water heater provided with an outlet for the escape of air, a spray chamber provided with an outlet for the escape of air, connections for passing water successively through the heater and spray chamber, and provisions for maintaining a steam pressure in the heater and spray chamber substantially above and approximately equal to the pressure of the atmosphere, respectively.

4. Water heating and treating apparatus comprising in combination, an open water heater, a cooler receiving air from the heater and provided with an outlet for the escape of air, a spray chamber, a second cooler receiving air from the spray chamber and provided with an outlet for the escape of air, connections for passing water successively through the heater and spray chamber, and provisions for maintaining a steam pressure in the heater and spray chamber substantially above and approximately equal to the pressure of the atmosphere, respectively.

5. Water heating and treating apparatus comprising in combination, an open water heater provided with an outlet for the escape of air, a spray chamber provided with an outlet for the escape of air, connections for passing water successively through the heater and spray chamber, and provisions for maintaining a steam pressure in the heater and spray chamber substantially above and aproximately equal to the pressure of the atmosphere, respectively, and a heat exchanger adapted to transfer heat from the water leaving the spray chamber to the water entering the heater.

Signed at Philadelphia, in the county of Philadelphia and State of Pennsylvania, this 1st day of April, A. D. 1926.

GEORGE H. GIBSON.